Jan. 22, 1963     H. J. LITTLE     3,074,466
EVACUATION RING FOR LAMINATING PROCESS
Filed July 23, 1962     2 Sheets-Sheet 1

INVENTOR.
Harvey J. Little
BY
Harness and Harris
ATTORNEYS.

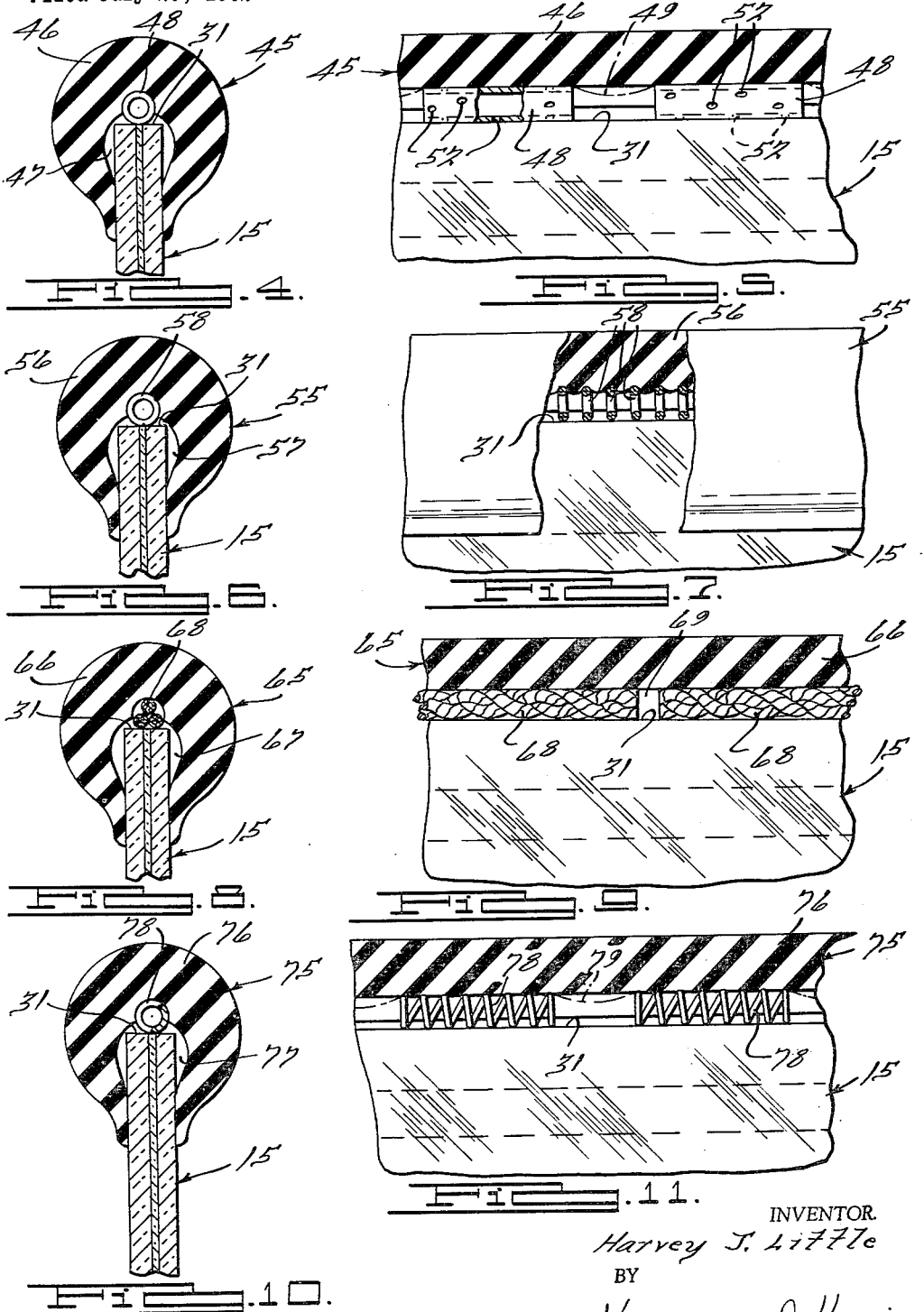

United States Patent Office 3,074,466
Patented Jan. 22, 1963

3,074,466
EVACUATION RING FOR LAMINATING PROCESS
Harvey J. Little, 2490 Middlefield, Trenton, Mich.
Filed July 23, 1962, Ser. No. 211,635
4 Claims. (Cl. 156—382)

This invention relates to an evacuation or de-airing ring for use in a lamination process, particularly an evacuation ring adapted for the elimination of air or gas from between the layers of the materials that are to be pressed together to form the laminated structure. This invention is directed primarily to the incorporation in a de-airing ring of a flexible stiffening element, such as a coil spring or spaced spring sections, spaced rigid tubes, spaced rigid rings, or spaced rope sections or the like that will prevent collapse of the de-airing ring about the edge of the laminated structure to which it is applied during the evacuation process. This application is a continuation-in-part of Harvey J. Little application Serial No. 856,053 filed November 30, 1959.

In the laminating of layer-like materials, such as a pair of interlayer spaced glass sheets, one of the problems that has to be overcome is the elimination of any air or gas from between the laminated layers prior to bonding of the layers into a unitary laminated structure. In the formation of a safety glass windshield wherein a plastic interlayer is placed between and bonded to a pair of glass plates, means must be provided for withdrawing or evacuating any air or gas that might otherwise be trapped between the glass layers during the laminating process. To accomplish this evacuation process it has been proposed to surround the peripheral edges of the glass sandwich with evacuation tubing, such as the tubing shown in the Drake Patent 1,870,284, and then apply a suction to the tubing at the same time that heat and pressure are applied to the exterior surfaces of the glass plates. When suction is applied to suction tubing of this type, it has been found that the vacuum created adjacent the edge of the glass laminate will cause collapse of the tubing against the end edges of the glass laminate and thereby seal off or prevent complete removal of any air or gas that may be entrapped between the plastic layer and the adjacent faces of the glass panel members. The incorporation of a rigidifying element, such as a coil spring, spaced tubular sections or rings, or rope, in the evacuation tubing, in the manner shown in FIGS. 1 and 2 or FIGS. 4–11 of the drawings, has overcome the problem of tubing collapse previously associated with this type of laminating apparatus and has provided a noteworthy improvement in the laminating process.

FIG. 4 is an enlarged sectional elevational view, similar to FIG. 2, of a modified form of this invention using spaced rigid tubular elements as de-airing ring anti-collapse means;

FIG. 5 is a fragmentary side elevational view of the FIG. 4 form with portions broken away for the sake of clarity;

FIG. 6 is an enlarged sectional elevational view, similar to FIG. 2, of another form of this invention using spaced rigid rings as de-airing ring anti-collapse means;

FIG. 7 is a fragmentary side elevational view of the FIG. 6 form with portions broken away for the sake of clarity;

FIG. 8 is an enlarged sectional elevational view, similar to FIG. 2, of a modified form of this invention using spaced flexible rope sections as de-airing ring anti-collapse means;

FIG. 9 is a fragmentary side elevational view of the FIG. 8 form with portions broken away for the sake of clarity;

FIG. 10 is a fragmentary side elevational view, similar to FIG. 2, of another modified form of this invention using spaced coil spring sections as the de-airing anti-collapse means; and FIG. 11 is a side elevational view of the FIG. 10 form of this invention with portions broken away for the sake of clarity.

Figure 1:
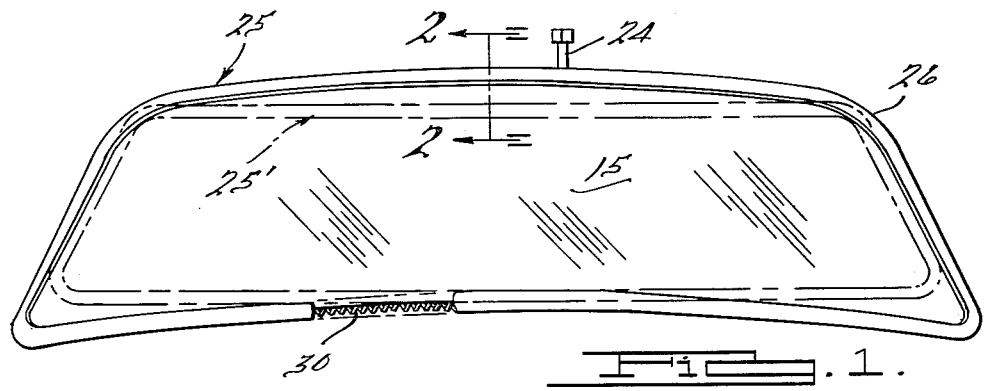
FIG. 1 is a front elevational view with portions broken away, showing an evacuation tube or de-airing ring embodying this invention applied to the periphery of a motor vehicle windshield, the broken lines indicating the normal size of the tubing before it is stretched to permit it to be mounted about the periphery of the windshield.

The reference numeral 15 represents a curved glass vehicle windshield composed of the spaced glass panels 16 and 17 that are joined together by a plastic interlayer sheet 18 arranged between and bonded thereto. It is common practice to join the spaced glass panels 16, 17 to the plastic interlayer 18 by means of heat and pressure applied to the exterior surfaces of the glass panels 16, 17 in an autoclave unit such as that indicated by the numeral 19 in FIG. 3. Autoclave unit 19 includes a tank 20 having a removable cover 21 that supports an air evacuation or suction line 22 on its interior surface. Connected to the suction line 22 are a number of quick-disconnect, self-sealing, valve controlled nozzles 23 that are adapted to be joined to the tube-like, self-sealing neck portions 24 of the de-airing rings that are each generally designated by the reference numeral 25. Suction line 22 is connected to some sort of a suction source 41 that may be a motor driven pump or the like. The cover 21 of the autoclave unit 19 preferably includes a discharge conduit 33 and a pressure safety valve 36.

The de-airing ring 25 embodying this invention is a continuous or closed ring formed of a resilient body material of rubber-like composition 26. The ring body 26 has a more or less U-shaped cross sectional configuration as clearly shown in FIG. 2. The body portion 26 includes a groove 27 that extends inwardly from the inner side edge thereof between the spaced leg portions 28. The groove 27 is adapted to receive the peripheral portions of the glass panel laminate structure 15. Mounted in the rubber body portion 26 of the ring 25 and extending longitudinally thereof adjacent the bight portion of the groove 27 is a continuous, extensible, coil spring 30. The coil spring 30 is highly resistant to radial collapse and is adapted to abut against the end edge 31 of the glass laminate 15 when the de-airing ring 25 is mounted about the peripheral portions of the glass laminate 15. As can be seen from the dashed contour line in FIG. 1, indicated by the reference numeral 25', the de-airing ring 25 is normally of slightly smaller peripheral length than the periphery of the glass laminate 15 on which it is to be mounted. Accordingly, the elastic evacuation ring 25 with its longitudinally extensible reinforcing wire coil 30 must be somewhat elongated in order to mount the ring 25 about the periphery of the glass laminate 15. The extensible coil spring 30 permits this elongation of the resilient de-airing ring body portion 26 while preventing radial collapse of the ring body or bight portion 26 against the end edges 31 of the glass laminate 15 during an evacuation operation.

In carrying out a laminating process that utilizes this invention, it is usual to first form the glass panel 16, 17 to the desired shape and to then insert a plastic interlayer 18 between the glass plates 16 and 17 so as to provide the laminating or sandwich construction that is generally designated by the reference numeral 15. The next stage in the laminating process is to mount the de-airing ring 25 about the peripheral edges 31 of the laminate sandwich 15. The undersize ring 25 may be readily stretched to permit its mounting about the periphery of the oversize laminate sandwich 15 because both the ring body material 26 and the reinforcing coil spring 30 are readily extensible. In practice it has been found that the ring 25 should in its normal shape be ½ inch per foot shorter than the periphery of the glass about which it is to be mounted. The de-airing ring 25 is mounted about the periphery of the glass laminate 15 and the inherent resilience of the ring contracts the ring groove portion 27 about the end edges 31 of the glass sandwich 15 until the coil spring 30 abuts the edges 31 of the glass 15. When suction is then applied to the groove 27 in the de-airing ring 25 through the ring neck portion 24 that is connected to a quick-disconnect suction nozzle 23, all gas or air will be evacuated from the space between the glass laminates 16, 17 and the interlayer 18. This de-airing process is preferably carried on in the autoclave unit that is generally designated by the reference numeral 19 in FIG. 3. As can be seen from FIG. 3 the autoclave unit has rack bars 34 that support the glass windshield assemblies 15 in adjacent, substantially vertical positions with the de-airing rings 25 attached to the peripheral surfaces of the windshield assemblies. The tube-like neck portions 24 of the de-airing rings 25 are connected to the self-sealing, quick-disconnect nozzles 23 that depend from the suction line header 22. While the air is being evacuated from between the glass layers 16, 17 of the glass sandwich 15 through the de-airing rings 25 and suction line 22, steam or some other hot pressurized fluid is supplied to the interior of the autoclave tank 20 through the supply conduit 35. The heat and pressure from the fluid contained within the autoclave unit 19 softens the plastic interlayer 18 and applies external pressure to the glass panels 16, 17 so as to effect the bonding of the glass layers 16, 17 to the interlayer 18. The external pressure on the panels 16, 17 further assists in squeezing any entrapped air from the space between the glass layers 16, 17 at the same time that the suction conduit 22 is withdrawing air therefrom through the conduit formed by the hollow coil spring 30 that runs along the end edges 31 of the glass laminate 15. The process hereinbefore described can be utilized for either edge tacking or completely laminating the panels 16, 17.

The advantages resulting from the use of an extensible, continuous or closed de-airing ring of the disclosed type are thought to be rather evident. First, such a ring can be used on a large number of different size and different shape laminate structures because of its flexibility and elasticity. Second, the ring provides a protective shield around the edges of the windshield assembly to prevent chipping or cracking of the glass assemblies during handling in the laminating process. Third, the rings are labor saving in that they can be quickly and easily applied to and removed from the peripheral portions of the glass laminates 15. Fourth, they are much less expensive than a tacking bag or any other types of equipment heretofore used for de-airing processes. Fifth, the incorporation of a longitudinally extensible, rigidifying tube in the ring body portion adjacent the groove thereon insures the maintenance of a free suction conduit about the laminate periphery so that a complete evacuation process can be achieved. Sixth, the use of a hollow, longitudinally extensible, rigidifying means 30 in the ring body portion 26 not only prevents complete collapse of the ring groove 27, but adds the interior hollow area of the rigidifying means 30 to the groove area 27 to provide an enlarged suction conduit to insure complete evacuation of the space between the panels 16, 17.

Figure 2:
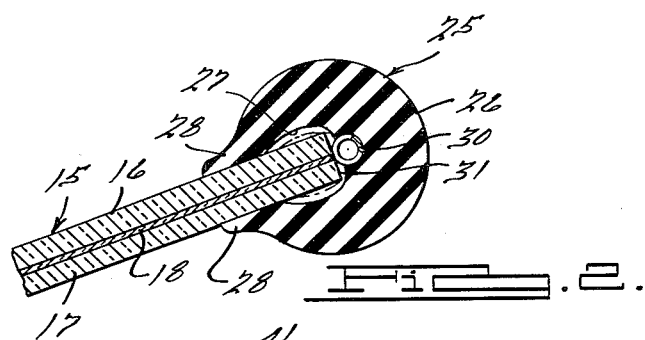
FIG. 2 is an enlarged sectional elevational view taken along the line 2—2 of FIG. 1.
Figure 3:
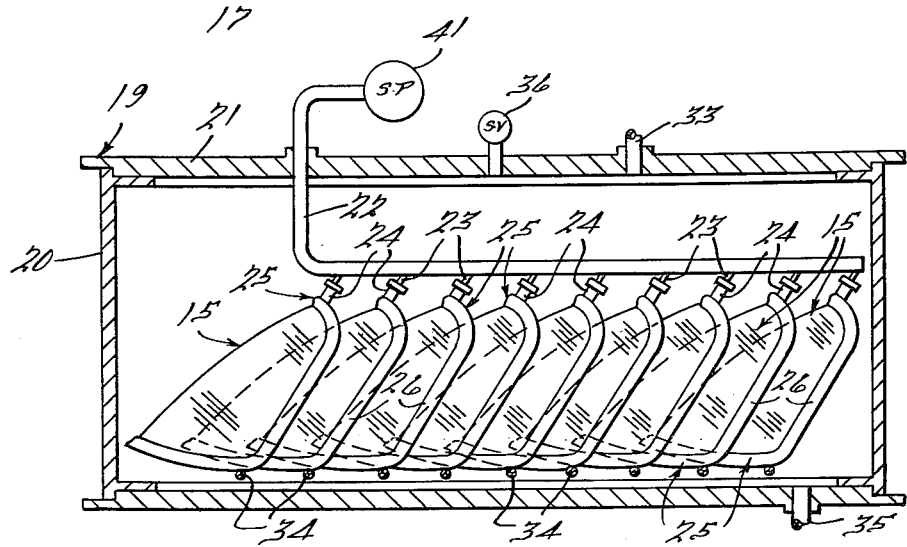
FIG. 3 is a sectional elevational view through an autoclave unit that houses a group of motor vehicle windshields having evacuation rings embodying this invention applied to their peripheral portions.

While a continuous coil spring 30 has been shown in FIGS. 1–3 as the longitudinally extensible rigidifying means for preventing radial collapse of the ring body portion 26 during the evacuation process, still, it is considered to be within the teachings of this invention to substitute for the continuous coil spring 30 any mechanical equivalent such as closely spaced sections of coil springs or closely spaced sections of relatively stiff rope or cording or the like, or spaced sections of rigid tubing, or closely spaced rigid rings located along the tube groove 27 and extending transversely thereof. These various alternate forms are shown in FIGS. 4–11. It is the incorporation of some form of rigidifying means in the ring body portion that will prevent radial collapse of the de-airing ring under suction while permitting radial or lateral flexing and longitudinal extensibility of the ring that comprises this inventive concept.

While this invention has been disclosed in combination with an autoclave unit 19 wherein the heating and pressing of the plastic interlayer occurs while the evacuation process is being carried on through the ring 25, still, it is to be pointed out that the evacuation ring 25 can be used at any time and in any surroundings to de-air the laminate 15 and then the ring enclosed assembly 15 can be disconnected from the suction nozzles 23 and the de-aired laminate 15 stored or moved to some other position for a subsequent operation.

FIGS. 4 and 5 show the de-airing ring 45 having a body portion 46 formed with a groove 47 of U-shaped cross sectional configuration. The groove 47 is adapted to receive the end edges 31 of the glass laminate assembly 15. Integrally mounted in the body portion 46 of the rubber-like de-airing ring 45 by a bonded connection, and arranged so as to project outwardly into the bight portion of the U-shaped groove 47, are a plurality of relatively closely spaced rigid tubular elements 48. The tubes 48 may be perforated as shown at 52. These rigid, spaced tubes 48, which may be of metal, plastic or a similar rigid material, are sufficiently stiff to prevent radial or lateral collapse of the adjacent, outwardly located, de-airing ring portions. The de-airing ring portions 49, located between the spaced tubes 48 (see FIG. 5) may be sucked slightly inwardly during a de-airing operation but there is never a chance of portions 49 shutting off the de-airing conduit formed along the end edge 31 of the laminate assembly. Because the tubes 48 are spaced sections interconnected by the resilient ring portions 49, it is clear that the ring 45 is longitudinally extensible so that it can be tensioned about the end edges 31 of variable size laminates 15 in sealing engagement therewith. It is believed to be obvious that the spaced tubular sections 48 will function in the same manner as the continuous coil spring 30 shown in FIGS. 1 and 2.

FIGS. 6 and 7 show a de-airing ring 55 having a body portion 56 formed with a groove 57 of U-shaped cross sectional configuration. The groove 57 is adapted to receive the end edges 31 of the laminate assembly 15. Integrally mounted in the ring body portion 56, by a bonded or molded connection, are a plurality of closely spaced rigid rings that extend radially with respect to the ring 55. These rings provide a suction conduit along the end edges 31 of the laminate assembly 15 and prevent radial collapse of the ring 55 against the laminate edges 31 during a de-airing operation. The rings 58 may be metal or a rigid plastic or similar material. The resiliently interconnected, spaced rigid rings 58 provide an anti-collapse means that prevents radial collapse of the resilient ring 55 against the laminate edges 31 and the rings 58 insure a continuous suction conduit along the laminate end edges 31.

FIGS. 8 and 9 show another form of this invention wherein spaced flexible sections of nylon or sisal twisted rope 68 are bonded or otherwise secured in the bight portion of the groove 67 in the body portion 66 of the rubber-like de-airing ring 65. The rope sections permit the ring 65 to be sealingly tensioned about the laminate end edges 31 while a continuous de-airing conduit is maintained along the laminate edges 31. The twisted strands of the rope sections 68 provide a plurality of air ducts along the laminate end edges 31. The rope sections 68 also provide a cushioned engagement with the edges 31 of the laminate assembly 15. The space 69 between the adjacent ends of the rope sections 68 permit longitudinal extension of the ring 65 to fit the ring about the end edges of the laminate assembly 15.

FIGS. 10 and 11 show a modified form of this invention wherein spaced sections of coil springs 78 are integrally mounted, by bonding or otherwise, in the bight portion of the groove 77 in the body portion 76 of the rubber-like, flexible, de-airing ring 75. The spaced sections of springs 78 provide for longitudinal extension of the ring 15 and give increased flexibility over the continuous coil spring 30 shown in FIGS. 1 and 2 form of this invention. The rubber-like ring material between the adjacent ends of the springs 78 may be slightly bowed inwardly, as shown at 79, during a de-airing operation but the continuous air conduit along the end edges 31 of the laminate assembly 15 will be maintained because of the radial rigidity of the coil spring anti-collapse means 78.

I claim:

1. An evacuation ring for a laminated structure including a pair of glass panels with a plastic interlayer therebetween, said ring being adapted to be connected to a suction source and to be stretch mounted around the peripheral end edges of the laminate structure, comprising a continuous ring of impervious, longitudinally extensible, elastic material having a continuous, longitudinally extending, groove in its inner peripheral surface adapted to surround and sealingly receive the peripheral end portions of said laminate, said groove having a bottom arranged to provide a continuous conduit in open communication with the end edges of the laminate throughout the length thereof, and closely spaced, integral, tubular rigidifying means for said ring carried by and extending longitudinally of the ring along said groove bottom and projecting laterally inwardly to abut against and to substantially space the groove bottom from the end edges of the laminate and prevent collapse of the ring against the end edges of the laminate when the ring is mounted on a laminate structure and is connected to a suction source, said spaced, tubular, rigidifying means being perforated along the area abutting the end edges of the laminate and having their closely spaced adjacent ends interconnected by unreinforced ring groove portions that provide conduit portions adapted for lateral flexing and longitudinal extensibility of the ring to fit the ring about the periphery of the associated laminate structure.

2. An evacuation ring for a laminated structure including a pair of glass panels with a plastic interlayer therebetween, said ring being adapted to be connected to a suction source and to be mounted around the peripheral end edges of the laminate structure, comprising a continuous ring of impervious, longitudinally extensible, elastic material having a continuous, longitudinally extending, groove in its inner peripheral surface adapted to surround and sealingly receive the peripheral end portions of said laminate, said groove having a bottom arranged to provide a continuous conduit in open communication with the end edges of the laminate throughout the length thereof, and spaced, integral, tubular rigidifying means for said ring carried by and extending longitudinally of the ring along said groove bottom and projecting radially inwardly to abut against and to substantially space the groove bottom from the end edges of the laminate and prevent collapse of the ring against the end edges of the laminate, said rigidifying means comprising closely spaced perforated tubular sections providing a continuously open suction conduit between the ring groove bottom and the laminate end edges.

3. An evacuation ring for a laminated structure including a pair of glass panels with a plastic interlayer therebetween, said ring being adapted to be connected to a suction source and to be mounted around the peripheral end edges of the laminate structure, comprising a continuous ring of impervious, longitudinally extensible, elastic material having a continuous, longitudinally extending, groove in its inner peripheral surface adapted to surround and sealingly receive the peripheral end portions of said laminate, said groove having a bottom arranged to provide a continuous conduit in open communication with the end edges of the laminate throughout the length thereof, and spaced, integral, tubular rigidifying means for said ring carried by and extending longitudinally of the ring along said groove bottom and projecting radially inwardly to abut against and to substantially space the groove bottom from the end edges of the laminate and prevent collapse of the ring against the end edges of the laminate, said rigidifying means comprising closely spaced multi-strand rope sections providing a continuously open suction conduit between the ring groove bottom and the laminate end edges.

4. An evacuation ring for a laminated structure including a pair of glass panels with a plastic interlayer therebetween, said ring being adapted to be connected to a suction source and to be mounted around the peripheral end edges of the laminate structure, comprising a continuous ring of impervious, longitudinally extensible, elastic material having a continuous longitudinally extending, groove in its inner peripheral surface adapted to surround and sealingly receive the peripheral end portions of said laminate, said groove having a bottom arranged to provide a continuous conduit in open communication with the end edges of the laminate throughout the length thereof, and spaced, integral, tubular rigidifying means for said ring carried by and extending longitudinally of the ring along said groove bottom and projecting radially inwardly to abut against and to substantially space the groove bottom from the end edges of the laminate and prevent collapse of the ring against the end edges of the laminate, said rigidifying means comprising closely spaced rigid rings providing a continuously open suction conduit between the ring groove bottom and the laminate end edges.

References Cited in the file of this patent

UNITED STATES PATENTS 2,948,645    Keim _____ Aug. 19, 1955